2,951,841
Patented Sept. 6, 1960

2,951,841
METHOD FOR THE SYNTHESIS OF DICARBOCYANINE DYES

Robert C. Wilson, Cranford, N.J., assignor to General Aniline & Film Corporation, New York, N.Y., a corporation of Delaware No Drawing. Filed Jan. 13, 1958, Ser. No. 708,348

5 Claims. (Cl. 260—240.5)

This invention relates to a new method for the synthesis of dicarbocyanine dyes in a practical and economical manner. The dicarbocyanine dyes which may be synthesized by the novel method of this invention may be represented by the following general formula:

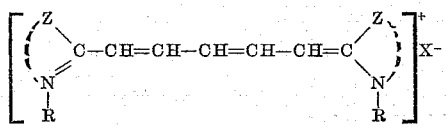

where Z means a group of atoms necessary to complete a 5- or 6- membered ring usual in the cyanine dye art as, for instance, a thiazole, oxazole, selenazole, indoline, oxazoline, thiazoline, selenazoline, pyridine, lepidine, imidoazole, quinoline or thiodiazole radical; these heterocyclic radicals may carry substituents such as alkyl, aryl, benzyl, phenylene, naphthylene and substituted phenyls or heterocyclic radicals or may be condensed with aromatic or heterocyclic rings; R means alkyl or aralkyl, and X means an anionic acid radical as for example Cl, Br, I, $SO_4$, $SO_3CH_3$, $SO_3C_2H_5$, $SO_3C_6H_4$—$CH_3$. By the process of this invention the foregoing dyes are readily synthesized by reacting quaternary salts of heterocyclic nitrogenous compounds containing a reactive alkyl group (preferably methyl) in the α or γ-position to the nitrogen atom in the presence of an alkaline condensing agent as for instance pyridine, quinoline, picoline, piperidine, or triethylamine with a compound of the general formula

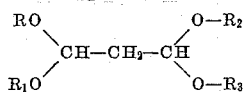

where R, $R_1$, $R_2$, and $R_3$ are alkyl groups of from 1 to 8 carbons of either similar or dissimilar structure.

These dicarbocyanine dyes are known in the art, and various methods have been disclosed for their preparation. In 1932, Irving et al., J.C.S. 1932, p. 260, reported the synthesis of a new class of cyanine dyes with the heterocyclic nuclei linked by a five carbon chain. Irving et al. employed in their work α-bromo (or chloro) β-anilinoacraldehyde anil, resultant from the reaction of mucobromic acid, CHO—CBr=CBr—COOH with aniline in an alcoholic solution as taught by Platz, Ber. 37, 4638 (1904).

Prior to Irving et al., Konig, Ber. 55, 3309, (1922), speculated on the existence of the dicarbocyanine series without indicating a method for their preparation.

An increase in the conjugated chain length connecting the heterocyclic nuclei typical of the carbocyanine series by a vinylene group results in producing a dye with its absorption shifted markedly towards the longer wave lengths with each vinylene group added.

That the importance of this type dyestuff has long been recognized by the art is exemplified in Konig, U.S. 1,524,791.

Piggot and Rodd, Br. Pat. 355,693 (1931), utilized an acetylated β-anilinoacrolein anil as the method for introducing the dicarbocyanine chain between quaternized bases with an activated methyl grouping. Recognizing the importance of this work, Zeh, U.S. 2,131,865, contributed further to the art by working with a similar unacetylated intermediate.

In their work on the preparation of dicarbocyanine dyes for use as sensitizers in photographic emulsions Kendall and Edwards, U.S. 2,412,815, resort to the use of β - (alkylmercapto) - acrolein dialkylmercaptals and β-(alkylmercapto)-acrolein dialkylacetals to react with a quaternary salt of a heterocyclic N-containing compound with a reactive methylene group in the α-position to the N atom to produce a symmetrical dicarbocyanine dyes useful as optical sensitizers for silver halide photographic emulsions.

Terutaro Ogata, Proc. Imp. Acad. Tokyo 9, 602 (1933), teaches the usage of propene dianil together with 2-methylbenzothiazole ethiodide in the presence of piperidine yields 3-ethyl-[5-(3-ethyl-2(3)-benzothiazolylidene) 1,3-pentadienyl] benzothiazolium iodide, green crystals with a metallic luster melting at 253° C. (d), in 61% of theoretical yield.

Stynik and Shteingardt, J. Applied Chem. (USSR) 9, 1842–9 (1936), report preparation of the same dicarbocyanine dyestuff with M.P. 230° by reacting 2-methylbenzothiazole ethiodide with β-ethoxy acrolein acetal in dry pyridine or a mixture of alcohol and piperidine.

The identical dye is again described by Kodak Ltd., Br. 556,266, whereby there is disclosed the preparation of polymethine dye intermediate of the general formula:

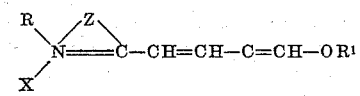

where R=alkyl or aryl radical, $R^1$=alkyl radical, Z=non-metallic atoms necessary to complete a heterocyclic 5 or 6 atom nucleus by reacting a β-alkoxy acrolein acetal with a cycloammonium quaternary salt containing a methyl group in the α-position to the N-atom. The reaction medium is substantially anhydrous acetic acid. By use of this intermediate prepared with 2-methylbenzothiazole ethyl iodide as the cycloammonium quaternary with additional 2-methylbenzothiazole ethyl iodide there is again obtained 3-ethyl-[5-(3-ethyl-2(3)-benzothiazolylidene) 1-3-pentadienyl] benzothiazolium iodide, M.P. 251–3° C.

The use of ortho-esters in the preparation of carbocyanine dyes is likewise well known to the art. Konig, Ber. 55, 3293 (1922), teaches the preparation of symmetrical carbocyanine dyes by the condensation of a quaternary salt containing a reactive methyl with ethyl orthoformate in acetic anhydride. In this reaction, alcohol and acid are eliminated, and the —CH— group of the orthoester provides the central =CH— group of the dye:

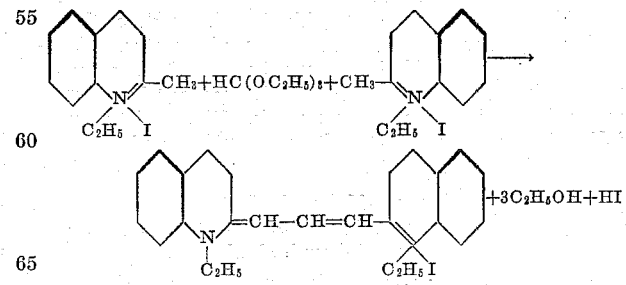

Hamer, J.C.S. 2796 (1927), extended the usefulness of Konig's work to include ethylorthoformate and use of the ortho esters in a pyridine system.

In my invention, I have learned that contrary to expectations, a malonaldehyde diacetal may be utilized to excellent advantage to introduce a dicarbocyanine chain between quaternized bases with an activated methylene group. In view of the disclosures of Konig and Hamer, it would not appear conceivable that two moles of the quaternary could enter into reaction with one mole of the diacetal to form a symmetrical dicarbocyanine dye. However, I have found that this is the case, and that a dicarbocyanine dye of exceptional purity is formed, the high yields obtained attesting to the fact that side reactions are at a minimum.

Furthermore, in spite of the teaching Kendal and Edwards, loc. cit.; Piggot and Rodd, loc. cit.; Stynik and Shteingardt, loc. cit.; and Ogata, loc. cit., I do not find it necessary to convert the diacetal to a more complex chemical form exemplified by their choice of β-ethoxy acrolein acetal, propenedianil, or β-(alkylmercapto) acrolein acetals to effect the desired synthesis of a pentadienyl linkage between two heterocyclic nitrogen-containing nuclei to form a dicarbocyanine dye. The product I obtain by the reaction of 1,1,3-triethoxy-3-monomethoxy propane (also known as Triethyl monomethyl malonaldehyde diacetal) with 2-methylbenzothiazole ethyliodide in a pyridine solvent has been established as a dye of identical structure with that reported by the prior art as 3-ethyl [5-(3-ethyl-2(3)-benzothiazolylidene)1-3-pentadienyl] benzothiazolium iodide, or more simply, 2(3)-2'(3')-diethylthiodicarbocyanine. It is worthy of note that by my novel synthesis of this compound, a new degree of purity is attained giving a product melting at 257.9–258.1° C., somewhat higher than previously reported by the prior art for this dicarbocyanine.

An obvious advantage of my invention is the straightforwardness of the reaction, eliminating formation of troublesome impurities as taught by Derchmeister, Levkoev and Lifshits, Zhur. Obshchei Khim. 23, 1529–35 (1953). In my invention pure entities, established by spectrophotometric data using highly purified samples as standards, are obtained by simply washing the crude dyestuff as obtained from the reaction mixture with water.

The details of the present invention will be apparent to those skilled in the art from a consideration of the following specific examples:

EXAMPLE 1

*Preparation of 3-ethyl-2-[5-(3-ethyl-2(3)-benzothiazolylidene)-1,3-pentadienyl]-benzothiazolium iodide (3,3'-diethylthiadicarbocyanine iodide)*

Into a 500 ml. 3-neck flask, equipped with an agitator, reflux condenser, and thermometer, was charged 15 grams 2-methylbenzothiazole ethiodide, 75 ml. pyridine, and 10.5 grams malonaldehyde diethyl ethyl methyl diacetal. This mixture was warmed to 112–115° C. and held at this temperature for about two hours. During the heating period the product separated from the reaction solvent in the form of bright green crystals. At the end of the heating period the reaction mixture was cooled to 25–30° C. and the product collected on a suction filter. The filter cake was washed with 50 ml. pyridine, then with 50 ml. isopropanol, and finally with water. The product was then dried in an oven below 90° C. to constant weight. There was obtained 9.3 grams of product in the form of lustrous green crystals. The product thus isolated was analyzed for nitrogen, sulfur, and iodine with the following results:

Percent N found=5.3
Percent S found=12.4
Percent I found=24.5

Based on an empirical formula of $C_{23}H_{23}IN_2S_2$ (molecular weight=518.5), the theoretical percent nitrogen, sulfur and iodine of the desired product is as follows:

Percent N, theory=5.4
Percent S, theory=12.4
Percent I, theory=24.5

The dyestuff dissolved in methylene dichloride forms a bright blue solution which exhibits a maximum absorption in the region of 655 mu.

The melting point of the product obtained above was found to be 257.9–258.1° C.

Based on the analytical information given above the product obtained is presumed to have the following structure:

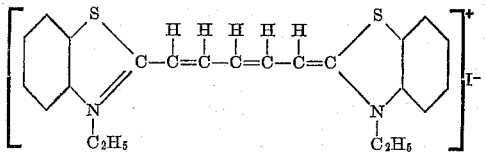

EXAMPLE 2

The product described in Example 1 was also obtained as follows: 15 grams 2-methylbenzothiazole ethiodide, 100 ml. isopropanol, 10.5 grams malonaldehyde diethyl ethyl methyl diacetal, and 3.0 ml. piperidine were charged into a flask equipped with a reflux condenser, agitator, and thermometer. The mixture was heated to reflux for 2–4 hours, then cooled to 25–30° C., filtered, washed with isopropanol and then with water. The product obtained after drying was identical to that described in Example 1.

EXAMPLE 3

*Preparation of 3-ethyl-2-5(3-ethyl-2(3)-benzoselenazoylidene)-1,3-pentadienyl benzoselenazolium iodide (3,3'-diethylselenodicarbocyanine iodide)*

Following the general procedure described in Example 1, 17.5 grams 2-methyl-benzoselenazole ethiodide, 10.5 grams malonaldehyde diethyl ethyl methyl acetal, and 75 ml. pyridine were heated together for two hours at 112–115° C., then the reaction mixture was cooled and filtered. After washing the solid crystalline product on the filter as described in Example 1 there was obtained a product melting at 236–237° C. which was identified as having the following structure:

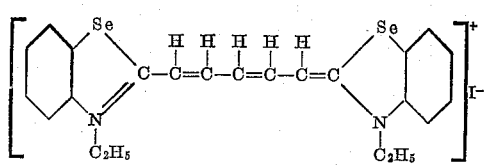

EXAMPLE 4

Following the general procedure described in Example 1 except that the 2-methylbenzothiazole ethiodide was replaced by an equimolar amount of 6-methoxy-2-methylbenzoxazole ethiodide there was obtained a dyestuff which corresponds to the following structure:

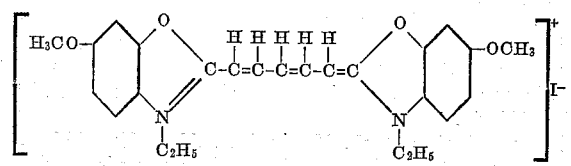

EXAMPLE 5

Following the general procedure described in Example 1 except that the 2-methylbenzothiazole ethiodide was replaced by an equimolar amount of 2,6-dimethylbenzothiazole ethiodide there was obtained a dyestuff corresponding to the following formula:

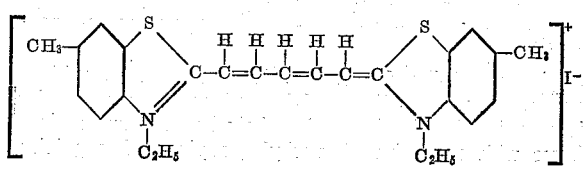

EXAMPLE 6

Following the general procedure described in Example 1 except that the 2-methylbenzothiazole ethiodide was replaced by an equimolar amount of 2,6-dimethylquinoline ethiodide there was obtained a dyestuff corresponding to the following formula:

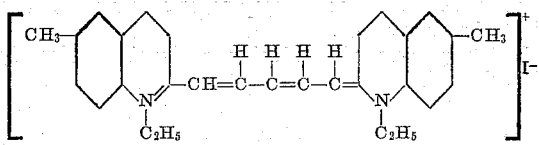

EXAMPLE 7

Into an apparatus similar to that described in Example 1 was charged 15 grams 2-methyl-benzothiazole ethiodide, 100 ml. isopropanol, 8.0 grams malonaldehyde diethyl ethyl methyl diacetal and 10 grams pyridine. The mixture was heated to reflux for 2 hours, cooled and filtered. After washing the solid crystalline product on the filter with isopropanol and then with water there was obtained a product identical to that described in Example 1.

EXAMPLE 8

Using the general procedure described in Example 1, other heterocyclic bases containing an active alkyl group in the α- or γ-position with respect to the nitrogen atom may be used in the synthesis of dicarbocyanine dyes. Examples of such bases are as follows:

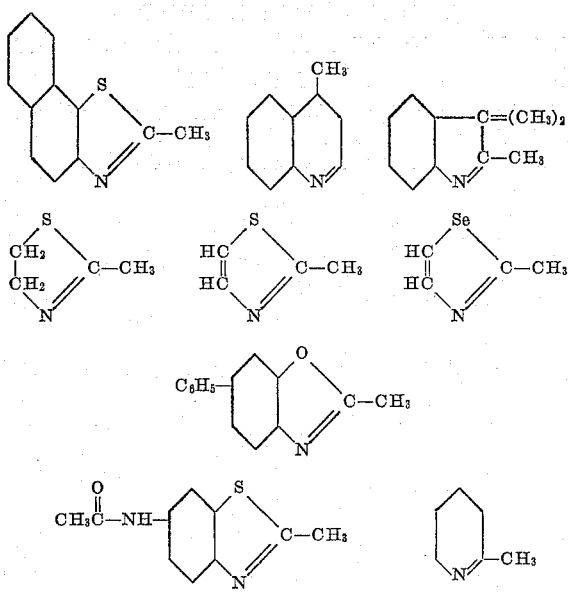

It will be understood that the foregoing specific examples are illustrative of preferred embodiments of the present invention. However, various modifications and extensions thereof will suggest themselves to those skilled in the art. Thus while in the foregoing examples the ethiodides of the heterocyclic nitrogen compounds containing a reactive alkyl group have been employed for reaction with the malonaldehyde diacetal, it will be apparent that if desired other alkyl halides or other quaternizing agents, e.g. methylchloride diethylsulfate, etc., may be employed to quaternize the heterocyclic nitrogenous compound containing an active group in the α- or γ-position to the nitrogen atom, and the thus obtained quaternary salt employed in the reaction. So far as operability of the process is concerned, I have noticed no difference in employing a variety of quaternizing agents and corresponding quaternary compounds. However, the ethiodides are preferred since the dicarbocyanine dye obtained when using them crystallizes out in a very pure form, while in using diethylsulfate as quaternizing agent, it was noted that the dicarbocyanine dye obtained was quite soluble and it was necessary to add a salt to the reaction mixture in order to separate the dye by crystallization. In a similar way while pyridine is preferred as the alkaline condensing agent as illustrated by Example 1, it functions both as a solvent and acid acceptor. The replacement of pyridine by other alkaline condensing agents, preferably tertiary amines, does not affect the operability of the process. It is also feasible as indicated by Example 2 to employ an inert liquid such as isopropanol as solvent for the reaction medium and include in it only such amount of alkaline condensing agent e.g. pyridine or piperidine as is theoretically required.

I claim:

1. The method of synthesizing dicarbocyanine dyes of the formula

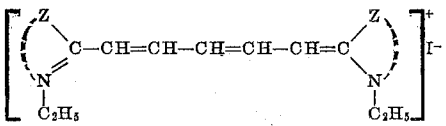

wherein Z is the residue of a heterocyclic nucleus selected from the group consisting of a thiazole nucleus, an oxazole nucleus, a selenozole nucleus, an indoline nucleus, an oxazoline nucleus, a thiazoline nucleus, a selenazoline nucleus, a pyridine nucleus, a lepidine nucleus, an imidoazole necleus, a quinoline nucleus and a thiodiazole nucleus, which comprises heating to reflux in an inert solvent containing a tertiary amine condensing agent selected from the group consisting of pyridine, quinoline, picoline, piperidine and triethylamine, a compound of the general formula

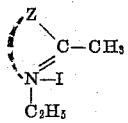

wherein Z is the residue of a heterocyclic nucleus selected from the group consisting of a thiazole nucleus, an oxazole nucleus, a selenozole nucleus, an indoline nucleus, an oxazoline nucleus, a thiazoline nucleus, a selenazoline nucleus, a pyridine nucleus, a lepidine nucleus, an imidoazole nucleus, a quinoline nucleus and a thiodiazole nucleus with a malonaldehyde diacetal of the formula

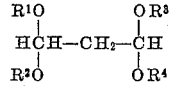

wherein $R^1$, $R^2$, $R^3$ and $R^4$ each represent an alkyl group of 1 to 8 carbon atoms.

2. The process of producing a dicarbocyanine dye of the formula

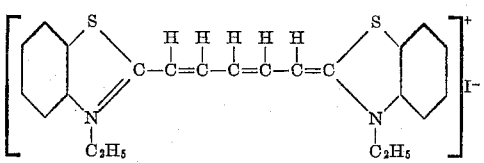

which comprises heating to reflux in an inert solvent containing a tertiary amine condensing agent, selected from the group consisting of pyridine, quinoline, picoline, piperidine and triethylamine, 2-methyl benzothiazole ethiodide and a malonaldehyde diacetal of the formula

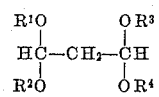

wherein $R^1$, $R^2$, $R^3$ and $R^4$ each represent an alky group of 1 to 8 carbon atoms.

3. The process of producing a dicarbocyanine dye of the formula

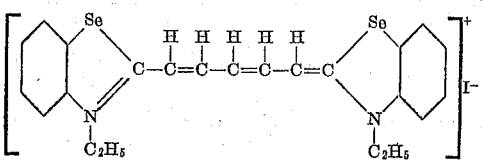

which comprises heating to reflux in an inert solvent containing a tertiary amine condensing agent selected from the group consisting of pyridine, quinoline, picoline, piperidine and triethylamine, 2-methyl benzoselenazole ethiodide and a malonaldehyde diacetal of the formula

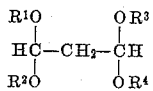

wherein $R^1$, $R^2$, $R^3$ and $R^4$ each represent an alkyl group of 1 to 8 carbon atoms.

4. The process of producing a dicarbocyanine dye of the formula

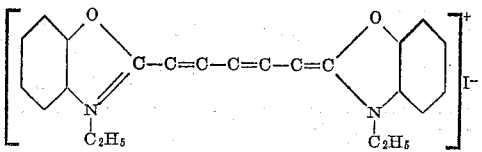

which comprises heating to reflux in an inert solvent containing a tertiary amine condensing agent selected from the group consisting of pyridine, quinoline, picoline, piperidine and triethylamine, 2-methyl benzoxazole ethiodide and a malonaldehyde diacetal of the formula

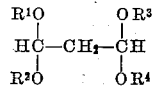

wherein $R^1$, $R^2$, $R^3$ and $R^4$ each represent an alkyl group of 1 to 8 carbon atoms.

5. The process of producing a dicarbocyanine dye of the formula

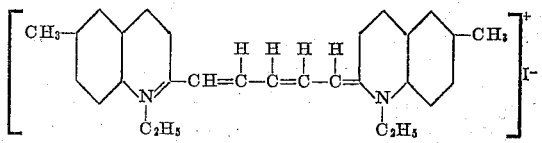

which comprises heating to reflux in an inert solvent containing a tertiary amine condensing agent selected from the group consisting of pyridine, quinoline, picoline, piperidine and triethylamine, 2,6-dimethyl quinoline ethiodide and a malonaldehyde diacetal of the formula

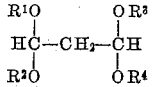

wherein $R^1$, $R^2$, $R^3$, and $R^4$ each represent an alkyl group of 1 to 8 carbon atoms.

References Cited in the file of this patent

UNITED STATES PATENTS 2,335,861    Kendall  ----------------  Dec. 7, 1953

OTHER REFERENCES

Venkataraman, Synthetic Dyes, vol. II, pp. 1163–64, Academic Press Inc., 1952.

Doja: Chem. Reviews, vol. 11, pp. 302–3 (1932).